(12) United States Patent
Suemoto et al.

(10) Patent No.: US 6,194,712 B1
(45) Date of Patent: Feb. 27, 2001

(54) SCANNER AND METHOD OF CONTROLLING SAME

(75) Inventors: Kazunori Suemoto; Yasunori Nishijima, both of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/159,762

(22) Filed: Sep. 24, 1998

(30) Foreign Application Priority Data

Sep. 30, 1997 (JP) .................................................. 9-282646
Sep. 30, 1997 (JP) .................................................. 9-282647

(51) Int. Cl.$^7$ ...................................................... H04N 1/00
(52) U.S. Cl. ........................................... 250/234; 358/400
(58) Field of Search .................................... 250/234, 235, 250/236, 208.1; 358/400, 404, 405, 406, 468, 471, 296

(56) References Cited

U.S. PATENT DOCUMENTS 5,231,500 * 7/1993 Miyaji et al. ......................... 348/220
5,432,532 * 7/1995 Mochimaru et al. ................. 347/176
5,992,743 * 11/1999 Suemoto et al. ................. 235/462.05

\* cited by examiner

Primary Examiner—John R. Lee (57) ABSTRACT

A scanner in which image data can be stored in a memory card and output to a computer is so adapted that a user can tell, at a glance, the destination of the output of image data representing the image of an original. The display screen of the scanner is provided with an output-destination display area. The icon of the memory card is displayed in the display area if the memory card has been loaded in the scanner, and the icon of the computer is displayed in the display area if the computer has been connected to the scanner. When the destination of the output of the image data is designated, the display of the designated destination is enclosed by a frame. The display enclosed by the frame is the destination of the output of image data, thus making it possible to ascertain the destination of the image data output at a glance. Further, the number of originals capable of being stored in the memory card can be ascertained. Specifically, the scanner having the freely removable memory card for storing image data senses the remaining storage capacity of the memory card. Before the image of an original is sensed, the size of the original to be sensed and the compression ratio of the image data stored in the memory card are decided.

24 Claims, 8 Drawing Sheets

SCANNER AND METHOD OF CONTROLLING SAME

BACKGROUND OF THE INVENTION

1. Field of the Invention

This invention relates to a scanner for capturing the image of a subject and outputting image data representing the image, as well as to a method of controlling the scanner.

2. Description of the Related Art

A scanner is utilized to enter the image of a photograph or the like (the image of a subject) into a computer as image data. The image of the original is captured by a line sensor included in the scanner as an image sensing device. Image data representing the image of the original is output from the scanner via an output port and is then applied to the computer, where the data is stored.

A scanner capable of being connected to a computer exhibits its functionality by being connected to the computer. In general, such a scanner cannot read an original in a stand-alone mode upon being disconnected from the computer. For this reason, scanners are being developed that are equipped with a memory for storing image data so that the image data can be stored in the memory in addition to being delivered from the output port.

If it is possible to store image data in memory and to output the image data, one cannot tell at a glance whether image data representing an original being read is being stored in memory or output from the scanner.

Further, the storage capacity of the memory is comparatively small. When image data that has been acquired by sensing an image is stored in the memory, the amount of memory remaining decreases and it may become impossible at some point to store image data in the memory.

SUMMARY OF THE INVENTION

Accordingly, an object of the present invention is to arrange it so that one can tell at a glance whether image data representing an original being read in a scanner that is capable of storing image data in a memory and of outputting the image data is being stored in the memory or output from the scanner.

Another object of the present invention is to arrange it so that the number of originals whose image data obtained by image sensing can be stored in memory is capable of being verified in a scanner that is capable of storing image data in a memory and of outputting the image data.

According to a first aspect of the present invention, the foregoing objects are attained by providing a scanner comprising image sensing means (an image sensing device) for sensing the image of a subject and outputting image data representing the image of the subject; image-data storage means (an image-data storage device) for storing image data applied thereto; an external output port for outputting the applied image data externally of the scanner; first selecting means (a first selecting device) for selecting whether image data that has been output from the image sensing means is to be applied to the image-data storage means or to the external output port; a changeover switch for applying the image data, which has been output from the image sensing means, to the image-data storage means or to the external output port depending upon the selection made by the first selecting means; and a display device for displaying information as to whether application of the image data, which has been output from the image sensing means, to the image-data storage means or to the external output port was selected by the first selecting means.

The first aspect of the present invention provides also a control method applied to the above-mentioned scanner. Specifically, there is provided a method of controlling a scanner having image sensing means for sensing the image of a subject and outputting image data representing the image of the subject, image-data storage means for storing image data applied thereto, and an external output port for outputting the applied image data externally of the scanner, the method comprising the steps of: selecting whether image data that has been output from the image sensing means is to be applied to the image-data storage means or to the external output port; applying the image data, which has been output from the image sensing means, to the image-data storage means or to the external output port depending upon the selection made; and displaying information as to whether application of the image data, which has been output from the image sensing means, to the image-data storage means or to the external output port was selected.

In accordance with the first aspect of the present invention, image data obtained by sensing the image of a subject can be stored in the image-data storage means and it is also possible to output the image data from the external output port to a device external to the scanner. The external output port would be connected to an image data processing device (a computer), and the image data output from the external output port would be input to and stored in the computer.

Whether image data that has been obtained by image sensing is to be stored in the image-data storage means or output from the external output port is selected by the first selecting means. Depending upon the selection made, the image data obtained by image sensing is stored in the image-data storage means or output from the external output port.

Furthermore, information relating to the selection made by the first selecting means, namely whether the image data that has been obtained by image sensing is to be applied to the image-data storage means or to the external output port, is displayed on the display device. One can determine, merely by observing the display on the display device, whether the image data that has been obtained by image sensing is to be stored in the image-data storage means or output from the external output port.

In a preferred embodiment, the scanner is provided with mode setting means (a mode setting device) for setting an automatic mode. When the automatic mode has been selected by the mode setting means, changeover control of the changeover switch and display control of the display device is carried out based upon a predetermined order of priority.

The order of priority in the automatic mode is stipulated as set forth below, and changeover control in the changeover switch and display control of the display device is carried out based upon the order of priority.

When the image data storage means is a memory freely removable from the scanner and the memory has been loaded in the scanner, image data obtained by image sensing is stored in the memory. Even if the freely removable memory has been loaded in the scanner, image data obtained by image sensing will be applied to the external output port in a case where the scanner has been connected to a computer via the external output port and the image of a subject is sensed based upon a command from the computer.

When the scanner is of the type having a freely removable memory and the memory has not been loaded in the scanner, image data obtained by image sensing is applied to the external output port. If the memory has not been loaded in the scanner and, moreover, the computer has not been connected to the scanner, sensing of the image of the subject is halted.

In the case described above, the scanner would be provided with a switch for sensing that the memory has been loaded in the scanner and with means for sensing that the computer has been connected to the scanner.

In a preferred embodiment, the external output port is an input/output port capable of entering image data provided from outside the scanner into the scanner, and the changeover switch is capable of being changed over to make possible the transmission of image data between the input/output port and the image-data storage means. Whether image data that has been externally applied to the input/output port is to be applied to the image-data storage means or image data that has been stored in the image-data storage means is to be read out and applied to the input/output port is selected. Changeover control is carried out in dependence upon the selection so as to switch between application of image data, which has been applied to the input/output port, to the image-data storage means, and readout of image data stored in the image-data storage means and application of this data to the input/output port. Depending upon the selection, information relating to the fact that transmission of image data between the input/output port and the image-data storage means has been selected is displayed on the display device.

Image data can be supplied from the computer, which is connected to the scanner, via the input/output port and the data supplied can be stored in the image-data storage means. Further, image data that has been stored in the image-data storage means can be read out, applied to the input/output port and output to the computer from the input/output port.

Even in this case information relating to the fact that transmission of image data between the input/output port and the image-data storage means has been selected is displayed on the display device. One can tell at a glance the transmission of data is to be carried out between the scanner and the computer connected to the scanner.

In a preferred embodiment, whether an image-data processing device has been connected to the external output port is sensed and, depending upon whether the connection has been sensed or not, information relating to the absence or presence of a connection to the image-data processing device is displayed on the display device. If the image-data storage means is an image memory that can be freely removed from the scanner, whether the image memory has been loaded or not is sensed and, depending upon whether loading of the memory has been sensed or not, information as to whether the image memory has been loaded or not is displayed on the display device.

Whether the image-data processing device has been connected to the external output port and whether the removable image memory has been loaded can be ascertained merely by observing the display device.

It is preferred that when it is selected by the first selecting means to apply image data to the image-data storage means, the image data is compressed at a compression ratio higher than that which prevails when it is selected by the first selecting means to apply image data to the external output port, and that the compressed image data be applied to the image-data storage means or external output port depending upon the selection made.

The storage capacity of a memory card (image-data storage means) is comparatively small. By contrast, the storage capacity of the image-data processing device connected to the external output port is large. When image data is stored in the memory card, the data is compressed at a compression ratio higher that prevails when the image data is output to the external output port. As a result, the amount of image data that can be stored in the memory card can be substantially increased.

According to a second aspect of the present invention, the foregoing objects are attained by providing a scanner comprising image sensing means (an image sensing device) for sensing the image of an original and outputting image data representing the image of the original; image-data storage means (an image data storage device) for storing image data applied thereto; an external output port for outputting the applied image data externally of the scanner; output-destination selecting means (an output-destination selecting device) for selecting whether image data that has been output from the image sensing means is to be applied to the image-data storage means or to the external output port; a changeover switch for applying the image data, which has been output from the image sensing means, to the image-data storage means or to the external output port depending upon the selection made by the output-destination selecting means; remaining-capacity sensing means for sensing remaining storage capacity of the image-data storage means; and imaged-original count calculating means for calculating, on the basis of the remaining storage capacity sensed by the remaining-capacity sensing means, the number of originals whose image data, which has been obtained by image sensing by the image sensing means, can be stored in the image-data storage means.

The second aspect of the present invention provides also a control method applied to the above-mentioned scanner. Specifically, there is provided a method of controlling a scanner having image sensing means for sensing the image of an original and outputting image data representing the image of the original, image-data storage means for storing image data applied thereto, and an external output port for outputting the applied image data externally of the scanner, the method comprising the steps of: selecting whether image data that has been output from the image sensing means is to be applied to the image-data storage means or to the external output port; applying the image data, which has been output from the image sensing means, to the image-data storage means or to the external output port depending upon the selection made; sensing remaining storage capacity of the image-data storage means; and calculating, on the basis of the remaining storage capacity sensed, the number of originals whose image data, which has been obtained by image sensing by the image sensing means, can be stored in the image-data storage means.

In accordance with the second aspect of the present invention, the remaining storage capacity of the image-data storage means (image memory) is sensed. On the basis of the remaining storage capacity sensed, the number of originals whose image data, which has been obtained by image sensing by the image sensing means, can be stored in the image-data storage means is calculated.

Since the number of originals is calculated, the user is capable of ascertaining how much image data, in terms of the number of originals whose images are represented by the image data, can be stored in the image-data storage means. When the storage capacity of the image-data storage means is inadequate, image-data storage means having a large amount of remaining capacity can be substituted for it if the image-data storage means is removable from the scanner. If the image-data storage means is fixed in the scanner, the image data that has been stored in the image-data storage means can be read out and stored in other image-data storage means.

It is possible to prevent a situation in which the sensing of the image of an original cannot be performed by the scanner because the remaining storage capacity of the image-data storage means in insufficient.

The number of originals capable of being stored in the image-data storage means can be calculated as follows:

If the sizes of originals whose images are sensed by the image sensing means are capable of being set, the number of originals capable of being stored in the image-data storage means is calculated based upon the set size of an original and the sensed remaining storage capacity of the image-data storage means.

Information relating to an original whose image has been sensed by the image sensing means is stored beforehand, and an original capable of being stored in the image-data storage means is calculated based upon the stored information and the remaining storage capacity of the image-data storage means. The information relating to the original may include the size of the original, the quantity of image data obtained when the image of the original is sensed by the image sensing means, etc. Originals capable of being stored in the image-data storage means may be calculated using information, contained in the stored information relating to an original, that relates to the image of the original whose image was sensed last. Since the images of originals of the same type (same size or of substantially the same quantity of image data, etc.) are often sensed using a scanner, the number of originals capable of being stored in the image-data storage means is relatively accurate.

If the scanner is one that is capable of prescanning an original in response to application of a prescan command, the number of originals that can be stored in the image-data storage means is calculated based upon information (size of the original, quantity of image data representing the image of the original obtained by image sensing, etc.) of the original obtained by sensing the image of the original by prescanning and the remaining storage capacity sensed by the remaining-capacity sensing means.

In general, the capacity of the image-data storage means is small regardless of whether it is freely removable from the scanner. It is contemplated, therefore, to compress the image data obtained by sensing the image of an original. If the image data is compressed, the quantity of image data that can be stored in the image-data storage means substantially increases. In a case where compressed image data is stored in the image-data storage means, the number of originals capable of being stored in the image-data storage means is calculated based upon the compression ratio of the means that compresses the image data and the remaining storage capacity sensed by the remaining-capacity sensing means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
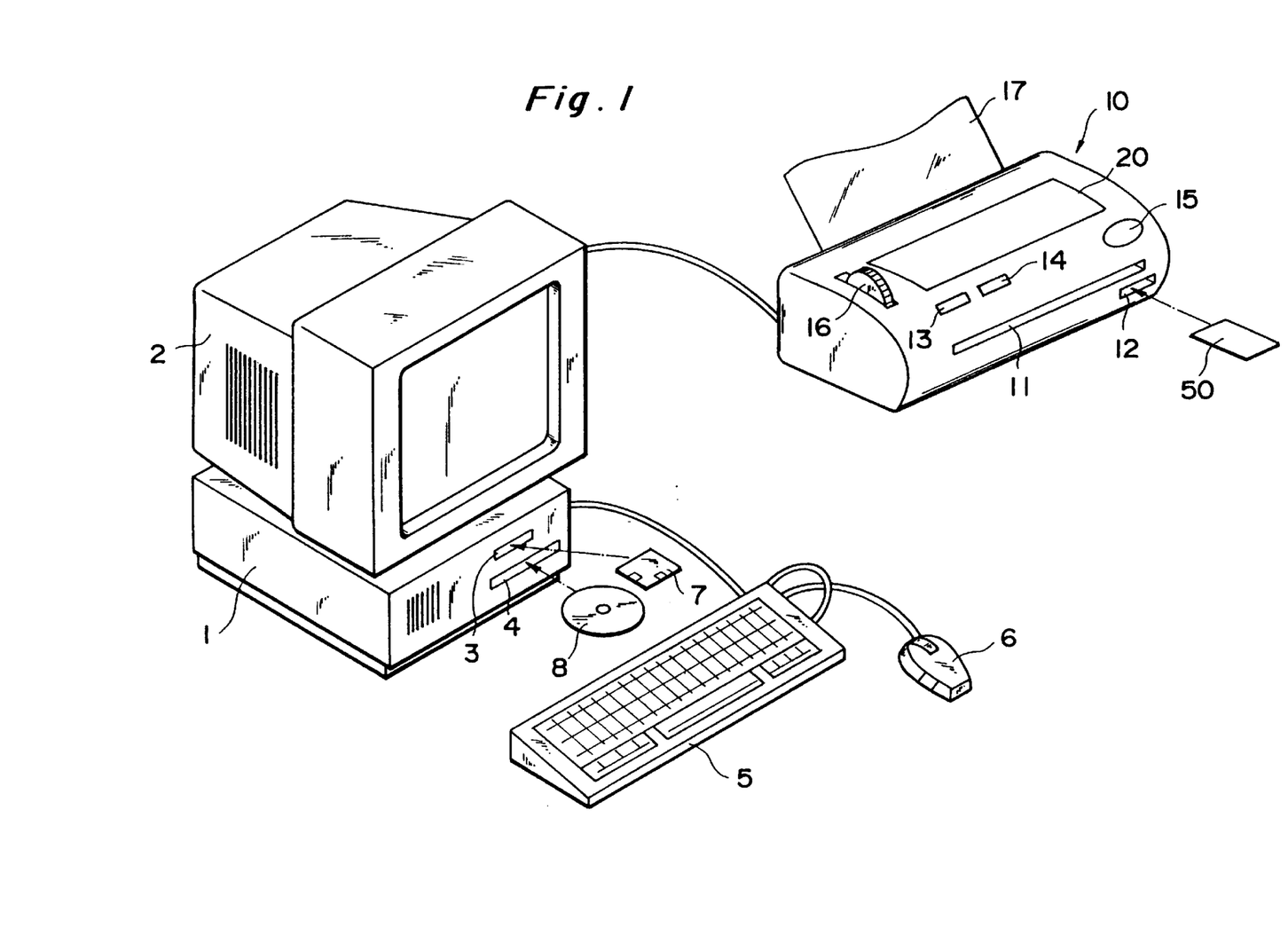
FIG. 1 is a perspective view showing the manner in which a computer and a scanner are connected.

FIG. 1 illustrates a scanner 10 and a computer 1 connected by a cable.

A CRT display device 2, keyboard 5 and mouse 6 are connected to the computer 1. The computer 1 is formed to have a slot 3 for inserting a floppy disk (FD) 7 and a slot 4 for inserting a compact disk-read-only memory (CD-ROM) 8.

The scanner 10 is capable of sensing the image of an original, outputting image data of the image represented on the original and storing the image data in the computer 1 connected to the scanner 10 by the cable. A memory card 50 can be loaded in the scanner 10 and image data can be stored on the load memory card 50.

A slot 12 for inserting the memory card 50 is formed in the front of the scanner 10 at the lower right-hand corner thereof. The front of the scanner 10 is further formed to include an original insertion slot 11 extending substantially across the full horizontal width of the front of the scanner. The back of the scanner 10 is formed to have discharge port (not shown) for discharging an original that has been read by the scanner 10. The back of the scanner 10 is provided with a tray 17 for receiving an original that has been discharged from the discharge port.

The top of the scanner 10 is formed to have a display screen 20 over substantially the entire area thereof. The left end of the scanner 10 on the top side thereof is provided with a freely rotatable scroll switch 16. A start/stop switch 15 for starting and stopping the reading of an original is formed on the top of the scanner at the forward right-hand corner thereof. A mode setting switch 13 for setting various modes of the scanner 10 and a switch 14 for applying a command to reproduce and a command to erase image data that has been stored in the memory card 50 are formed on the top of the scanner at the forward left-hand corner thereof.

Figure 2:
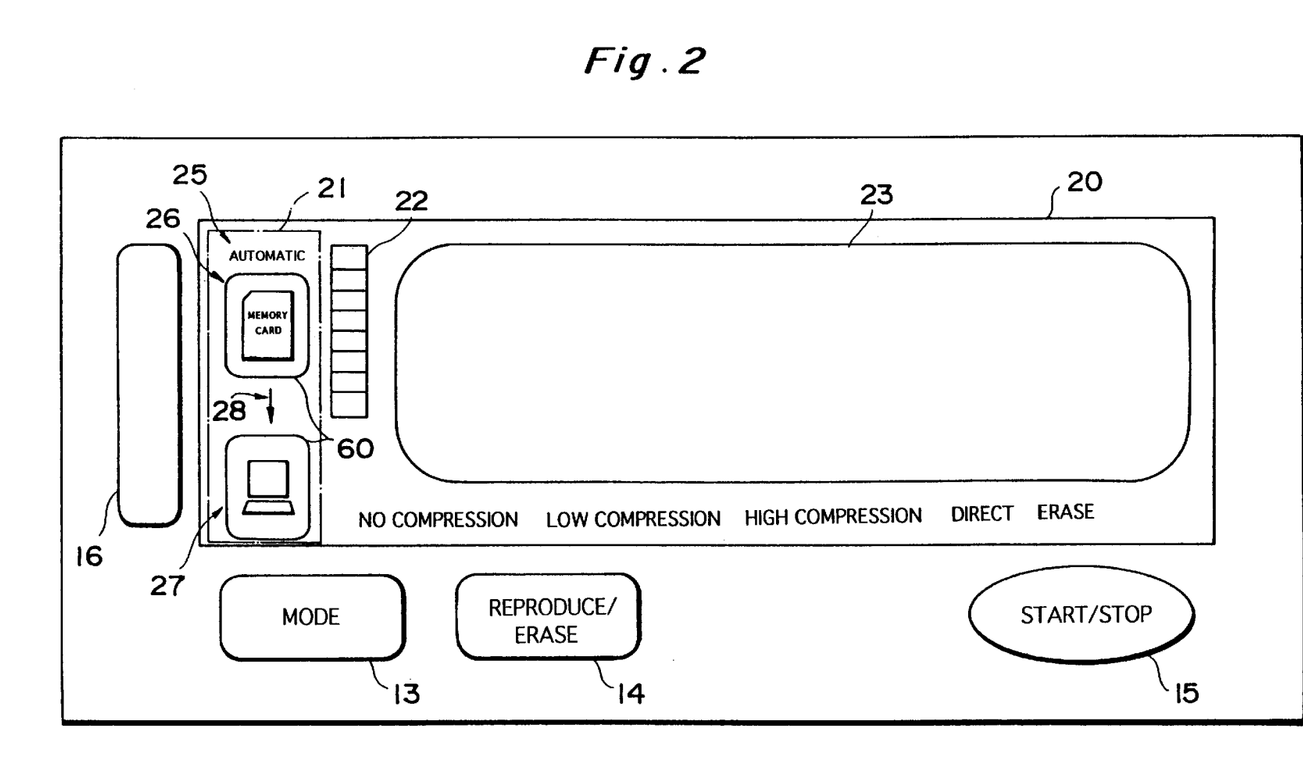
FIG. 2 is a plan view of the scanner.

FIG. 2 is a plan view of the scanner 10. The tray 17 is not shown in FIG. 2.

The display screen 20 is formed to have an image display area 23 occupying substantially the entirety of the screen 20. An image represented on an original being read by the scanner 10 is displayed on the image display area 23 as the original is being read.

The left side of the display screen 20 includes an output-destination display area 21 which displays the output destination of image data. The output-destination display area 21 includes an area 25 which, when the automatic mode has been set by the mode setting switch 13, presents a display to this effect; an area 26 in which an icon of the memory card 50 is displayed when the memory card 50 has been loaded in the scanner 10; an area 27 in which an icon of the computer is displayed when the computer 1 has been connected to the scanner 10; and an area 28 in which an arrow indicating the output destination of the image data is displayed upon selection of direct access (in which image data is output from the computer 1 and stored in the memory card 50 loaded in the scanner 10, or in which image data that has been stored in the memory card 50 loaded in the scanner 10 is read and output to the computer 1 connected to the scanner 10).

In the scanner according to this embodiment, image data of an image represented by a read original can be compressed in two stages, namely a low-compression stage in which the compression ratio is low and a high-compression stage in which the compression ratio is high. If image data has been compressed and then read, information as to whether compression is low compression or high compression is displayed on the display screen 20. When direct access has been set, this information also is displayed on the display screen 20. When erasure of image data has been set by the reproduce/erase switch 14, this information also is displayed on the display screen 20.

The display screen 20 is formed to include a display section 22 indicating the amount of storage capacity remaining in the memory card 50 loaded in the scanner 10.

Figure 3:
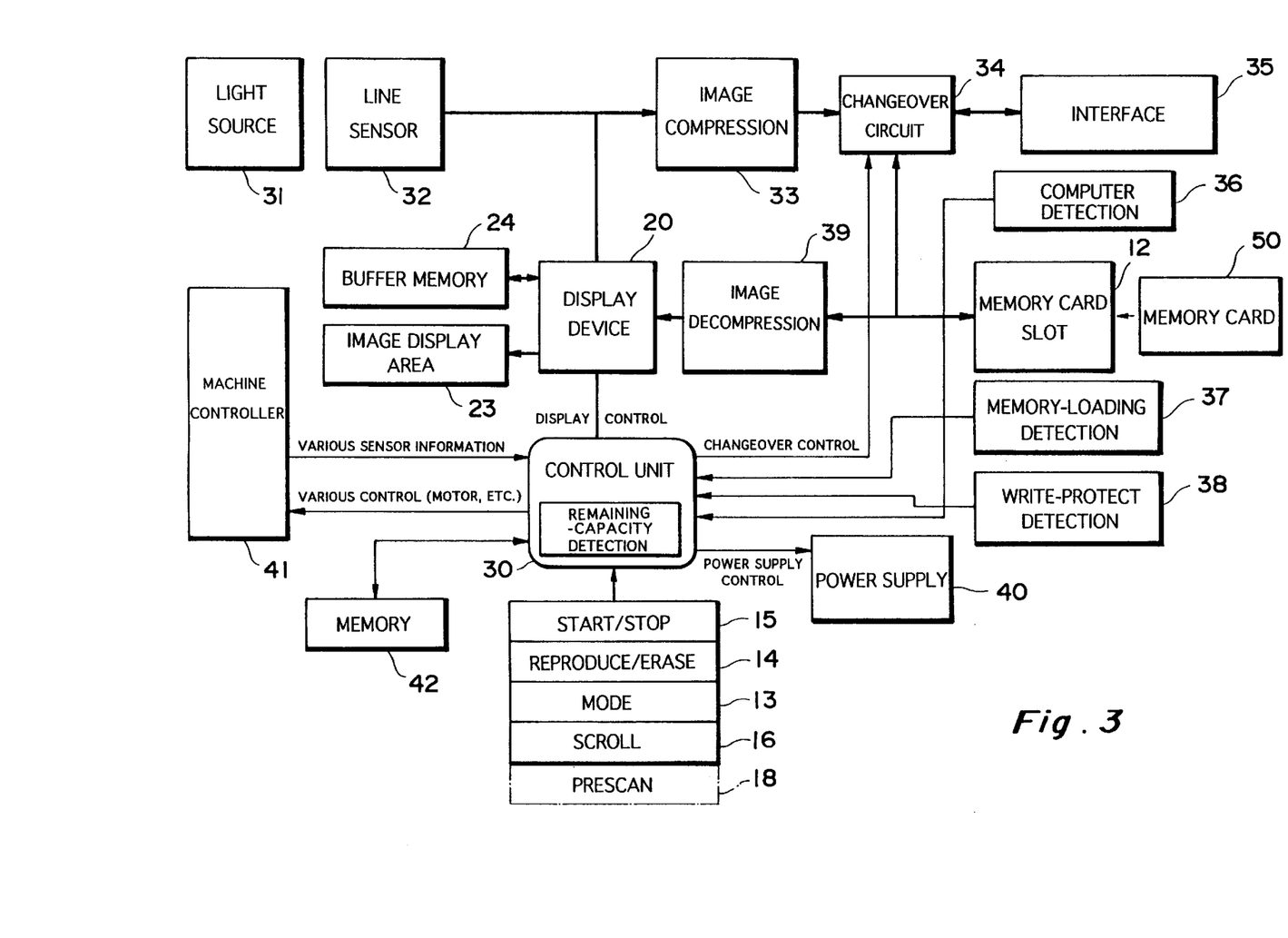
FIG. 3 is a block diagram showing the electrical construction of the scanner.

FIG. 3 is a block diagram illustrating the electrical construction of the scanner 10.

The overall operation of the scanner 10 is supervised by a control unit 30.

Signals representing the settings of the various switches formed on the scanner 10 are input to the control unit 30.

An original is inserted into the insertion slot 11 and illuminated by a light source 31. The original is fed at a constant speed by a machine controller 41 controlled by the control unit 30. A line sensor 32 extending laterally of the scanner 10 is provided. The original being fed at the constant speed has its image read by the line sensor 32, which outputs image data representing the image of the original.

The image data output by the line sensor 32 is applied to a display unit 20 (to facilitate an understanding of the invention, the display unit has the same reference characters as the display screen) and to an image compression circuit 33.

A buffer memory 24 is connected to the display unit 20. The buffer memory 24 has enough capacity to store image data that represents an image corresponding to several lines. Image data that has been input to the display unit 20 is applied to the buffer memory 24 and is updated in sequential fashion. By reading the image data that has been stored in the buffer memory 24, an image corresponding to several lines represented by the image data stored in the buffer memory 24 is displayed in the image display area 23.

The compression ratio of image data is set by the scroll switch 16, as will be described later. Image data that has been input to the image compression circuit 33 is compressed in accordance with the compression ratio set by the scroll switch 16. Image data compressed by the image compression circuit 33 is applied to a changeover switch 34. It is of course permissible to decide the compression ratio of the image compression circuit 33 in dependence upon the output destination of the image data. The capacity of the memory card 50 is comparatively small. When the image data is stored in the memory card 50, therefore, the data would be subjected to high compression. When the image data is output to the computer 1, low compression (or no compression) would be applied to the image data.

The scanner 10 is capable of outputting the image data of the read original to the computer 1 and of storing the image data in the memory card 50. The scanner 10 is provided with an interface 35 in order to transmit image data to the computer 1. The slot 12 for inserting the memory card 50 is formed in the scanner 10, as set forth above. Based upon a changeover control circuit from the control unit 30, the changeover switch 34 switches between a mode in which image data output from the image compression circuit 33 is applied to the interface 35 and a mode in which this data is applied to the memory card insertion slot 12. The changeover switch 34 is changed over in such a manner that image data can be transmitted from the interface 35 to the insertion slot 12 and from the insertion slot to the interface 35.

The scanner 10 is provided with a computer-connection detecting circuit 36 for detecting that the scanner 10 and the computer 1 have been connected by connecting a cable to the interface 35. The connection detection signal from the computer-connection detecting circuit 36 is input to the control unit 30.

The scanner 10 is further provided with a memory card sensing switch 37 for sensing that the memory card 50 has been inserted into the memory card insertion slot 12. The memory card 50 has a write-protect function for inhibiting writing of image data. A write-protect detecting circuit 38 is provided for detecting whether the memory card 50 loaded in the scanner 10 is being protected from the writing of image data. The signal output by the memory card sensing switch 37 and the signal output by the write-protect detecting circuit 38 enter the control unit 30.

The memory card 50 includes an image-data storage area for storing image data and a header area for storing various information inclusive of a path to image data. Data representing the remaining storage capacity of the memory card 50 also is stored in the header area. When the memory card 50 is loaded in the scanner 10, data that has been stored in the memory card 50 and that indicates the remaining capacity of the memory card 50 is applied to the control unit 30, which proceeds to detect the remaining storage capacity of the memory card 50, as will be described later. It goes without saying that the remaining storage capacity of the memory card 50 can be detected by detecting a blank area in the image-data storage area of the memory card 50. This approach can be adopted if data indicating the remaining storage capacity of the memory card 50 has not been stored in the memory card.

A memory 42 for temporarily storing data is connected to the control unit 30. Whenever an original has its image sensed by the scanner 10, information regarding the original (e.g., the size of the original, the quantity of data constituting the image represented on the original, etc.) is stored in the memory 42.

The scanner 10 includes an image-data decompressing circuit 39 for decompressing image data that has been compressed. Compressed image data is stored in the memory card 50. In a case where uncompressed image data is to be transmitted to the computer 1, the compressed data can be transmitted to the computer 1 upon being decompressed in the image-data decompressing circuit 39.

The scanner 10 includes a power supply 40. The various circuits included in the scanner 10 are operated by voltage supplied from the power supply 40.

Figure 4:
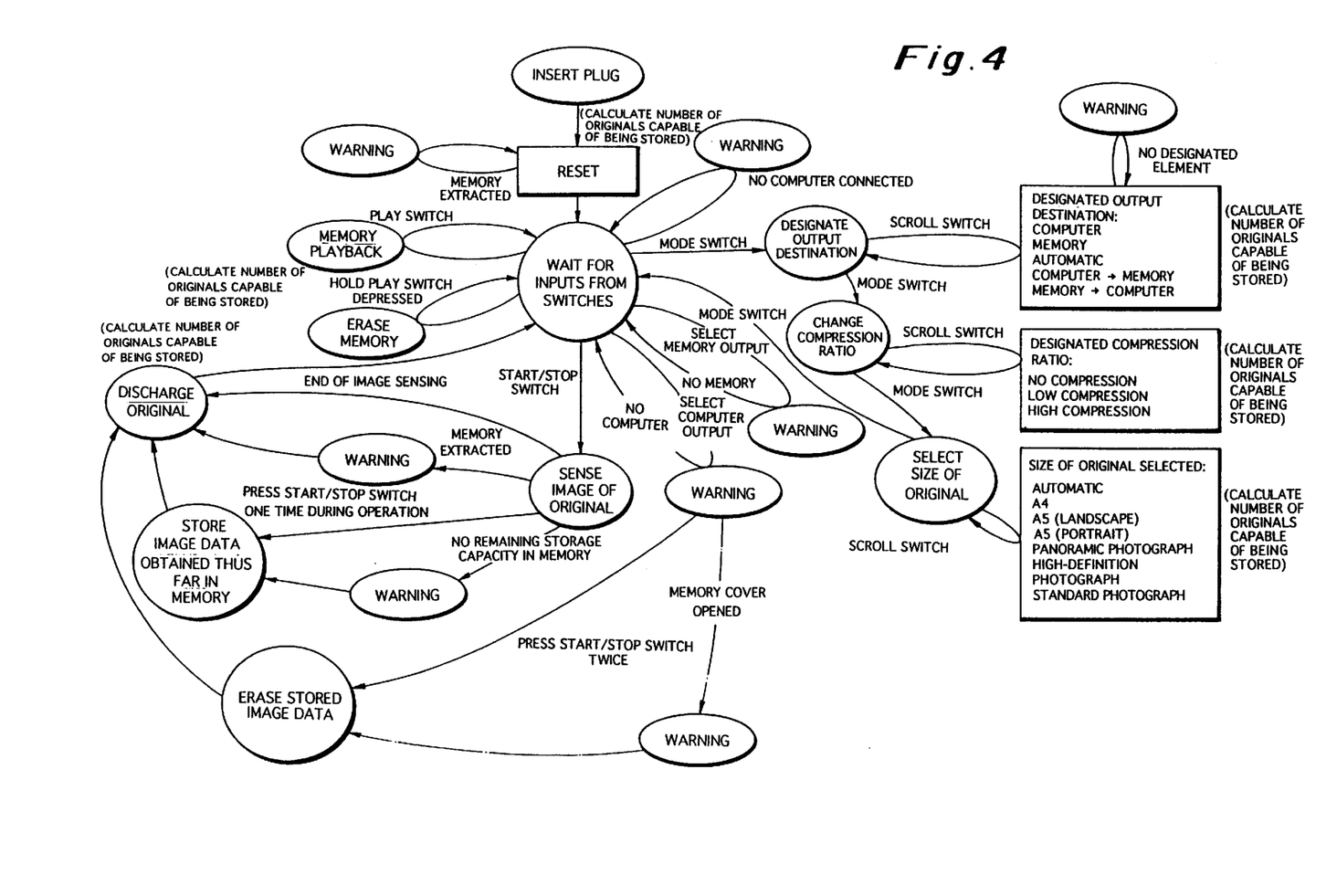
FIG. 4 is a status transition diagram illustrating the operation of the scanner.

FIG. 4 is a diagram showing status transition of the scanner 10.

Power is supplied to the scanner 10 (and the scanner is reset) by inserting a plug (not shown) of the scanner 10 into a plug socket.

If the memory card 50 has been loaded in the scanner 10 when the scanner 10 is thus reset, data stored on the memory card 50 and indicating the remaining storage capacity thereof is read and applied to the control unit 30. The number of originals (the quantity of image data representing images) capable of being stored in the memory card 50 is calculated based upon the remaining storage capacity. More specifically, the calculation is performed as follows: The quantity of image data representing the image of an original is substantially dependent upon the size of the original and the compression ratio. The number of originals capable of being stored in the memory card 50 is calculated by dividing the remaining storage capacity of the memory card 50 using data obtained by multiplying, by the compression ratio, the quantity of image data corresponding to the size of the original set at the time of the resetting operation. The calculated number of originals is displayed in the display area 20 as the following message: "ANOTHER XX SHEETS CAN BE STORED IN THE MEMORY CARD".

When the power supply of the scanner 10 is turned on, the scanner 10 first is reset. A state is then attained in which inputs from the various switches 13, 14, 15 and 16 are awaited.

Once resetting has been performed, the detection signal from the computer-connection detecting circuit 36 and the detection signal from the memory card sensing switch 37 enter the control unit 30, whereby it is detected based upon these detection signals whether the computer 1 has been connected to the scanner 10 and whether the memory card 50 has been loaded in the scanner 10. When the computer 1 has not been connected to the scanner 10 or when the memory card 50 has not been loaded in the scanner 10, indications to this effect are displayed in the image display area 23. An alarm tone also is output if necessary.

If the mode setting switch 13 is pressed once, a mode for designating the output destination of image data is established. Moving the scroll switch 16 in the mode for designating the destination of image data output causes a frame 60 to move between the areas 26 and 27 in the output-destination display area 21. The icon of the memory card or computer enclosed by the frame 60 represents the destination of the output of image data obtained by image sensing. There is also an automatic mode for deciding the destination of the image data output automatically. This mode also can be designated by operating the scroll switch 16. When the automatic mode has been designated, the destination of image data output is decided in accordance with a predetermined order of priority.

By way of example, when the memory card 50 has been loaded in the scanner 10, the changeover switch 34 is changed over so as to store the image data in the memory card 50. In a case where the scanner 10 has been connected to the computer 1 and the scanner 10 senses the image of an original in response to a command from the computer 1, the changeover switch 34 is controlled in such a manner that the image data obtained by image sensing enters the computer 1 via the interface 35 even if the memory card 50 has been loaded in the scanner 10. When the computer 1 has been connected to the scanner 10 and the memory card 50 has not been loaded in the scanner 10, the changeover switch 34 is changed over so as to input the image data to the computer 1. When the computer 1 has not been connected to the scanner 10 and, moreover, the memory card 50 has not been loaded in the scanner 10, sensing of the image of the original is halted.

If the memory card 50 is selected as the destination of the output of image data, the number of originals that can be stored in the memory card 50 is calculated again and displayed on the display screen 20 in the manner described above.

The scanner 10 is capable of being accessed directly, as mentioned above. If, based upon direct access, the designation of the destination of image data output is indicated in such a manner that image data output from the computer 1 is stored in the memory card 50 loaded in the scanner 10, and in such a manner that image data that has been stored in the memory card 50 is output to the computer 1 connected to the scanner 10, then both the icon of the memory card and the icon of the computer are enclosed by frames and the destination of the output of image data is indicated by an arrow.

A warning is issued by a display or audible tone when the computer 1 or memory card 50 selected as being the destination of the output of image data by the scroll switch 16 or decided as being the destination of the output of image data by the automatic mode has not been connected or loaded.

If the mode switch 13 is pressed one more time, a transition is made to a mode for setting the compression ratio of the image data. The setting of compression ratio also is carried out by the scroll switch 16 in a manner similar to the setting of the destination of the output of image data. Moving the scroll switch 16 causes characters representing no compression, low compression or high compression to be displayed on the display screen. The compression ratio of the image data is decided by pressing the scroll switch 16 one more time when any of these characters are being displayed on the display screen 20.

When the compression ratio is decided, the number of originals capable of being stored in the memory card 50 is calculated again using the decided compression ratio in a manner similar to that described above, and the number calculated is displayed on the display screen 20.

If the mode switch 13 is pressed one more time, a transition is made to a mode for selecting the size of the original. Selection of the size of the original is made by the scroll switch 16. Moving the scroll switch 16 causes a display representing the size of the original to be displayed on the display screen. According to this embodiment, sizes A4, A5 (landscape), A5 (portrait), panoramic photograph, high-definition photograph and standard photograph are available as the sizes of originals capable of being selected. The image of the original is imaged by the line sensor 32 within the selected limits (length and width). It is also possible to select the size of the original automatically. When automatic is selected, the image of the original in the width direction thereof is imaged by the entire line sensor 32 and the sensing of the image is carried out up to the end of the original.

When the destination of output of the image data, the compression ratio and the size of the original are thus selected, a state is again attained in which inputs from the various switches are awaited.

A warning is issued by a display or audible tone when the memory card 50 is not loaded in the scanner 10 regardless of the fact that the memory card 50 has been designated as the destination of output of image data, or when the computer 1 is not connected to the scanner 10 regardless of the fact that the computer 1 has been designated as the destination of output of image data.

When the reproduce/erase switch 14 is pressed, image data that has been stored in the memory card 50 loaded in the scanner 10 is reproduced. The image data reproduced is applied to the display unit 20, whereby the image is displayed. If the reproduce/erase switch 14 is held depressed for longer than a fixed period of time, image data that has been stored in the memory card 50 loaded in the scanner 10 is erased.

If image data that has been stored in the memory card 50 is erased, the amount of storage capacity remaining increases. The number of originals capable of being stored in the memory card 50 is calculated again based upon the remaining storage capacity increased by the erasure of image data, and the number is displayed on the display screen 20.

If the start/stop switch 15 is pressed one time, the operation for sensing the image of an original that has been inserted into the scanner 20 starts. It will be assumed below that the memory card has been designated as the destination of the output of image data.

The image data obtained by sensing the image of the original is stored in the memory card 50. When the operation for sensing the image of the original ends, the original that was inserted from the original insertion slot 11 is discharged from into the discharge tray 17. When this occurs, a state is again attained in which inputs from the various switches are awaited.

If the memory card 50 loaded in the scanner 10 is ejected during the operation for sensing the image of an original, the image sensing operation is suspended, a warning is issued by a display or audible tone and the original is fast-forwarded by the machine control circuit 41 so as to be discharged into the discharge tray 17.

If the start/stop switch 15 is pressed once during sensing of the image of an original, image data representing the image that was sensed until the switch 15 was pressed is stored in the memory card 50 loaded in the scanner 10. Further, when the memory card 50 is filled to capacity during sensing of the image of an original and storage of image data can no longer be carried out, a warning is issued by a display or audible tone, image data is stored in the memory card 50 to the maximum degree possible and the original is discharged form the scanner.

If the start/stop switch 15 is pressed twice within a fixed period of time during the sensing of the image of the original, the image data obtained by sensing of the image is erased from the memory card 50. The original is discharged from the discharge tray 17 following erasure of the image data.

It is also possible to provide the memory card insertion slot 12 of the scanner 10 with a cover in order to protect the memory card 50. It may be so arranged that when the cover is provided, image data that has been stored thus far by image sensing is erased from the memory card if the cover is opened during the sensing of the image of the original.

When an original is discharged from the discharge tray 17, the number of originals capable of being stored in the memory card 50 is calculated again and displayed on the display screen 23 in the manner described above.

In the embodiment described above, the number of originals capable of being stored in the memory card 50 is calculated based upon the set size of the original, compression ratio and remaining storage capacity of the memory card 50. However, when image data is not compressed, the number of originals capable of being stored in the memory card 50 would be calculated based upon the set size of the original and remaining storage capacity of the memory card 50.

Furthermore, the number of originals capable of being stored in the memory card 50 can also be calculated based upon image sensing information that has been stored in the memory 42. For example, the number of originals capable of being stored in the memory card 50 can be calculated based upon the size of the original (or the quantity of image data that represents the image of the original) whose image was sensed last.

Furthermore, an original whose image is to be sensed can be prescanned beforehand and the quantity of image data that represents the size of the original or the image of the original can be calculated by prescanning. The number of originals capable of being stored in the memory card 50 can be calculated based upon the calculated image data and the remaining storage capacity of the memory card 50.

FIGS. 5a through 5e, FIGS. 6a through 6e, FIGS. 7a through 7e and FIGS. 8a through 8e illustrate modes of displays presented in the output-destination display area 21 on the display screen 20 of the scanner 10. The icon of the memory card 50 is displayed in the output-destination display area 21 when the memory card 50 has been loaded in the scanner 10, and the icon of the computer 1 is displayed in the output-destination display area 21 when computer 1 has been connected to the scanner 10.

FIGS. 5a through 5e illustrate modes of displays presented when the computer 1 has been connected to the scanner 10 and the memory card 50 has been loaded in the scanner 10. In this case the icon of the memory card is displayed in the area 26 of the output-destination display area 21 and the icon of the computer is displayed in the area 27.

Figure 5A:
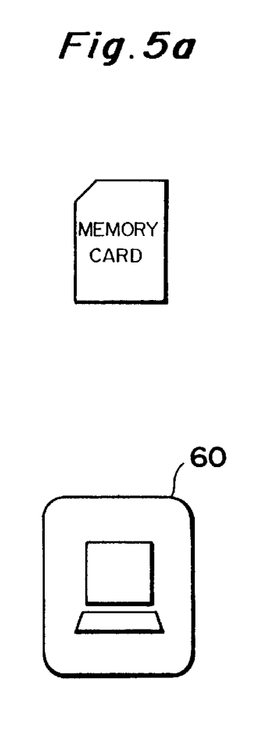
FIGS. 5a through 5e illustrate modes of displaying image-data output destination areas.

FIG. 5a shows the mode of display presented when the computer 1 has been designated as the destination of output of image data. Here the icon of the computer 1 is enclosed by the frame 60 so that it will be understood that the image data will be output to the computer 1.

Figure 5B:
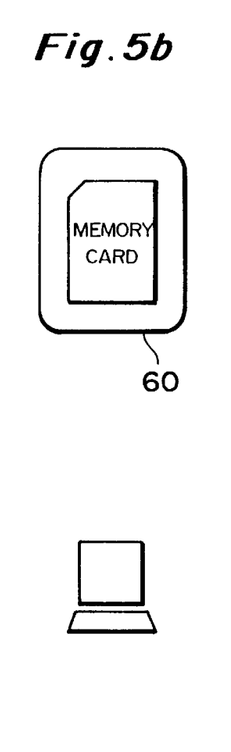

FIG. 5b shows the mode of display presented when the memory card 50 has been designated as the destination of output of image data. Here the icon of the memory card 50 is enclosed by the frame 60 so that it will be understood that the image data will be output to the memory card 50.

Figure 5C:
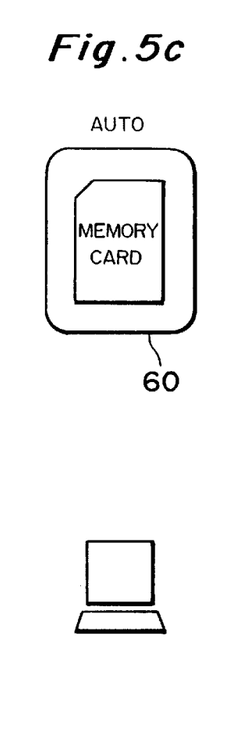

FIG. 5c shows the mode of display presented when the memory card 50 has been decided as the destination of output of image data in the automatic mode.

Figure 5D:
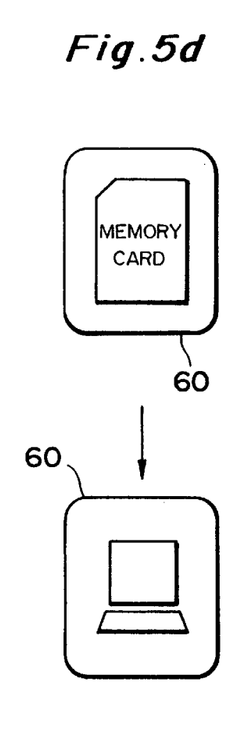

FIG. 5d shows the mode of display presented when image data that has been stored in the memory card 50 is output to the computer 1 in direct access.

Figure 5E:
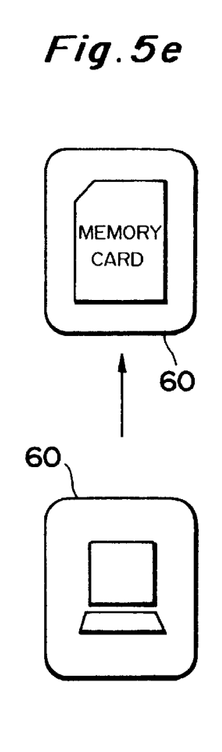

FIG. 5e shows the mode of display presented when image data that has been output from the computer 1 is stored in the memory card 50.

FIGS. 6a through 6e illustrate modes of displays presented in the output-destination display area 21 when the memory card 50 has been loaded in the scanner 10 but the computer 1 has not been connected to the scanner 10. FIGS. 7a through 7e illustrate modes of displays presented in the output-destination display area 21 when the computer 1 has been connected to the scanner 10 but the memory card 50 has not been loaded in the scanner 10. FIGS. 8a through 8e illustrate modes of displays presented in the output-destination display area 21 when the computer 1 has not been connected to the scanner 10 and the memory card 50 has not been loaded in the scanner 10.

Figure 6A:
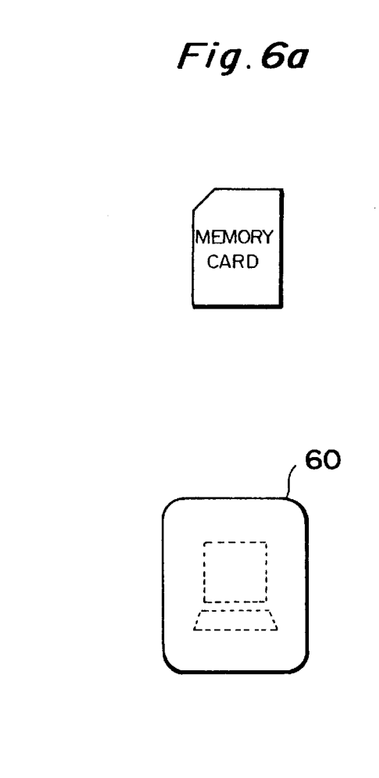
FIGS. 6a through 6e illustrate modes of displaying image-data output destination areas.
Figure 6B:
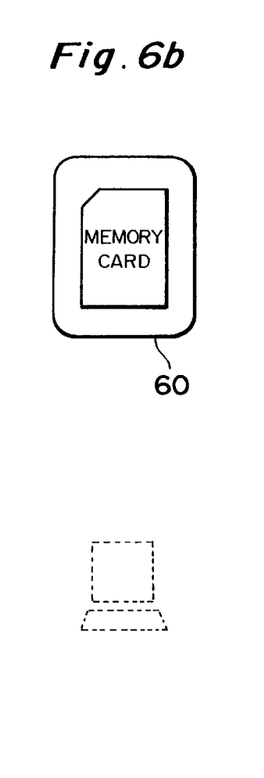
Figure 6C:
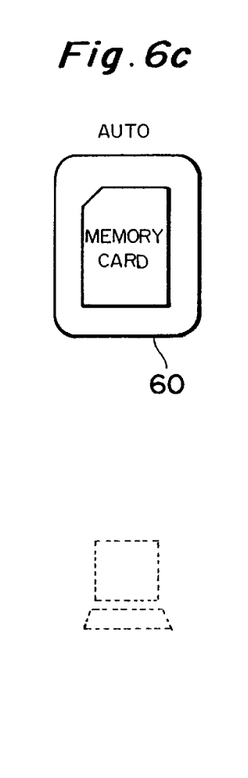
Figure 6D:
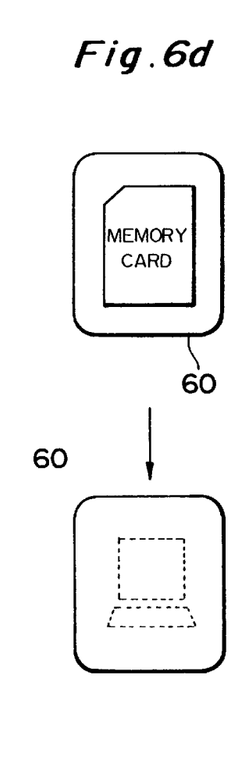
Figure 6E:
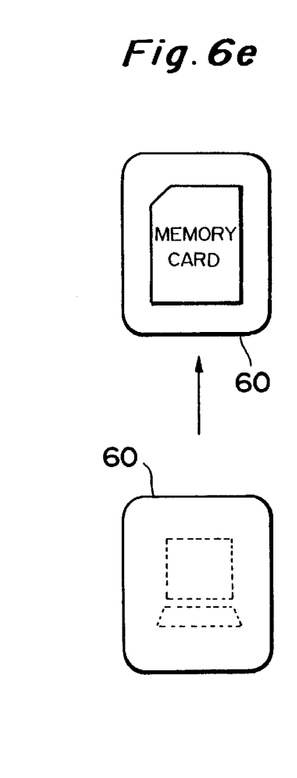
Figure 7A:
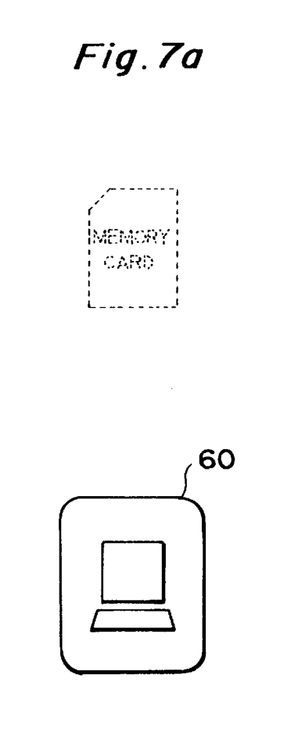
FIGS. 7a through 7e illustrate modes of displaying image-data output destination areas.
Figure 7B:
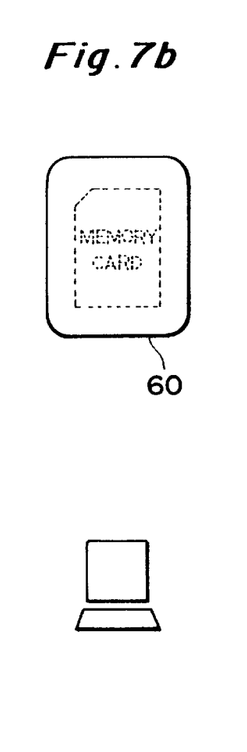
Figure 7C:
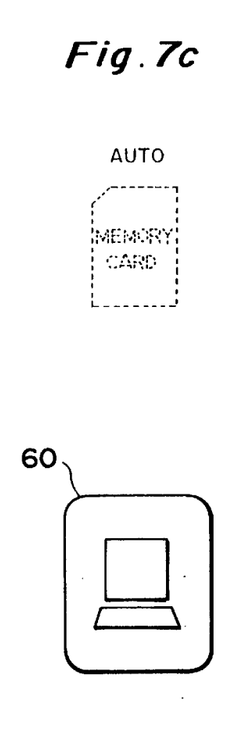
Figure 7D:
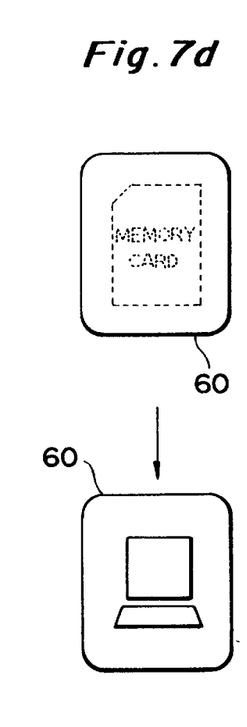
Figure 7E:
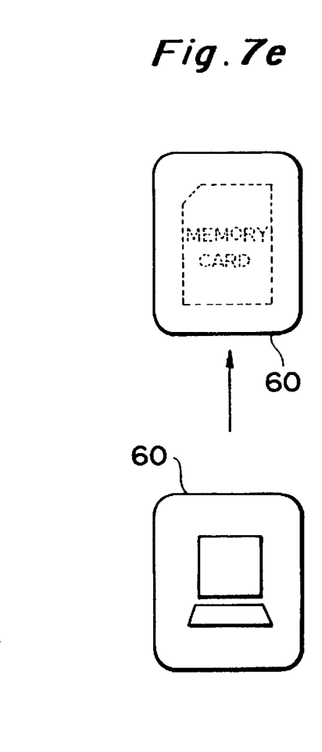
Figure 8A:
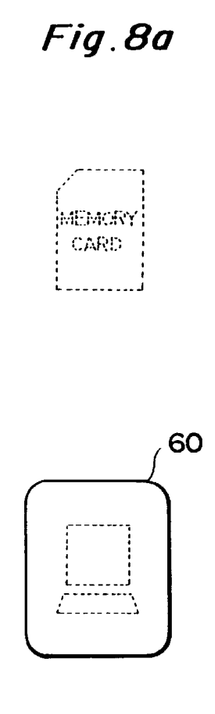
FIGS. 8a through 8e illustrate modes of displaying image-data output destination areas.
Figure 8B:
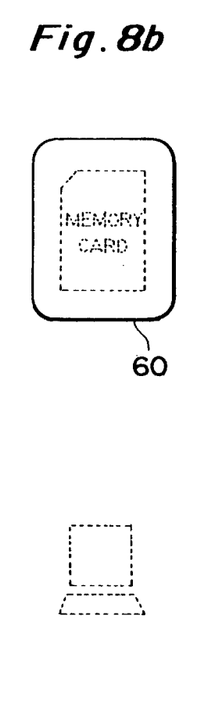
Figure 8C:
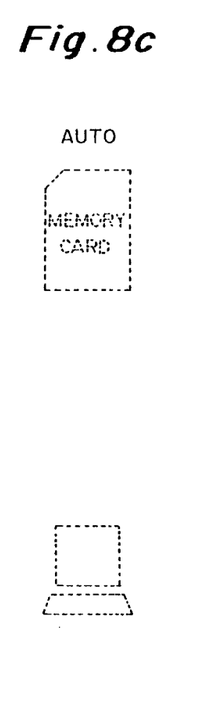
Figure 8D:
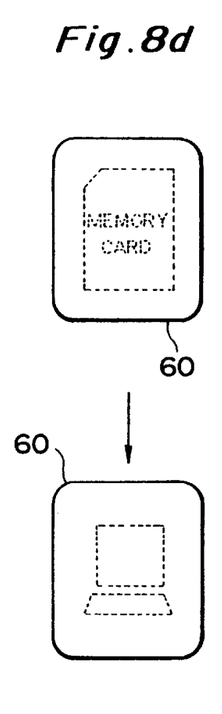
Figure 8E:
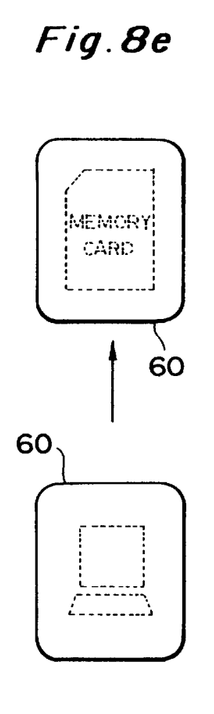

FIGS. 6a, 7a and 8a are modes of displays presented when the computer 1 has been designated as the destination of output of image data. FIGS. 6b, 7b and 8b are modes of displays presented when the memory card 50 has been designated as the destination of output of image data. FIGS. 6c, 7c and 8c are modes of displays presented when the automatic mode has been designated. FIGS. 6d, 7d and 8d are modes of displays presented when the computer 1 has been designated as the destination of output of image data in direct access. FIGS. 6e, 7e and 8e are modes of displays presented when the memory card 50 has been designated as the destination of output of image data in direct access.

When an unloaded memory card 50 or unconnected computer 1 has been designated as the destination of output of image data, a warning is issued in the manner described above.

As many apparently widely different embodiments of the present invention can be made without departing from the spirit and scope thereof, it is to be understood that the invention is not limited to the specific embodiments thereof except as defined in the appended claims.

What is claimed is:

1. A scanner comprising:
   an image sensing device for sensing the image of a subject and outputting image data representing the image of the subject;
   an image-data storage device for storing image data applied thereto;
   an external output port for outputting the applied image data externally of the scanner;
   a first selecting device for selecting whether image data that has been output from said image sensing device is to be applied to said image-data storage device or to said external output port;
   a changeover switch for applying the image data, which has been output from said image sensing device, to said image-data storage device or to said external output port depending upon the selection made by said first selecting device; and
   a display device for displaying information as to whether application of the image data, which has been output from said image sensing device, to said image-data storage device or to said external output port was selected by said first selecting device.

2. The scanner according to claim 1, further comprising:
   an automatic-mode selecting device for setting an automatic mode; and
   control means for controlling said changeover switch and said display device, when the automatic mode has been selected by said automatic-mode selecting device, so as to control changeover of said changeover switch and control display of said display device based upon a predetermined order of priority.

3. The scanner according to claim 1, wherein said external output port is an input/output port capable of entering image data provided from outside the scanner into the scanner, and said changeover switch is capable of being changed over to make possible transmission of image data between said input/output port and said image-data storage device; and said scanner further comprises:
   a second selecting device for selecting whether image data that has been externally applied to said input/output port is to be applied to said image-data storage device or image data that has been stored in said image-data storage device is to be read out and applied to said input/output port;
   a changeover control device for controlling said changeover switch, in dependence upon the selection made by said second selecting device, so as to switch between application of image data, which has been applied to said input/output port, to said image-data storage device, and readout of image data, which has been stored in said image-data storage device, and application of this data to said input/output port; and
   first display control means, responsive to the selection made by said second selecting device, for causing information relating to the fact that transmission of image data between said input/output port and said image-data storage device has been selected to be displayed on said display device.

4. The scanner according to claim 1, further comprising:
   a connection sensing device for sensing whether an image data processing device has been connected to said external output port; and
   second display control means for causing information relating to absence or presence of a connection to said image-data processing device to be displayed on said display device depending upon whether or not the connection has been sensed by said connection sensing device.

5. The scanner according to claim 1, wherein said image-data storage device is an image memory freely removable from the scanner, and said scanner further comprises:
   a loading sensing device for sensing whether said image memory has been loaded in the scanner; and
   third display control means for causing information as to whether said image memory has been loaded or not to be displayed on said display device depending upon whether or not loading of said image memory has been sensed by said loading sensing device.

6. The scanner according to claim 1, further comprising:
   a data compression device for compressing image data that has been output from said image sensing device; and
   compression control means for controlling said data compression device in such a manner that when it is selected by said first selecting device to apply image data to said image-data storage device, the image data is compressed at a compression ratio higher than that which prevails when it is selected by said first selecting device to apply image data to said external output port;
   wherein said changeover switch applies image data that has been compressed by said data compression device to said image-data storage device or to said external output port depending upon the selection made by said first selecting device.

7. A method of controlling a scanner having image sensing device for sensing the image of a subject and outputting image data representing the image of the subject, image-data storage device for storing image data applied thereto, and an external output port for outputting the applied image data externally of the scanner, the method comprising the steps of:
   selecting whether image data that has been output from said image sensing device is to be applied to said image-data storage device or to said external output port;
   applying the image data, which has been output from said image sensing device, to said image-data storage device or to said external output port depending upon the selection made; and
   displaying information as to whether application of the image data, which has been output from said image sensing device, to said image-data storage device or to said external output port was selected.

8. The method according to claim 7, further comprising the steps of:
   making it possible to set an automatic mode; and
   controlling changeover in said changeover switch and display by said display device based upon a predetermined order of priority when the automatic mode has been set.

9. The method according to claim 7, wherein said external output port is an input/output port capable of entering image data provided from outside the scanner into the scanner, and said changeover switch is capable of being changed over to make possible transmission of image data between said input/output port and said image-data storage device; and said method further comprises the steps of:

selecting whether image data that has been externally applied to said input/output port is to be applied to said image-data storage device or image data that has been stored in said image-data storage device is to be read out and applied to said input/output port;

performing changeover control, in dependence upon the selection made, so as to switch between application of image data, which has been applied to said input/output port, to said image-data storage device, and readout of image data, which has been stored in said image-data storage device, and application of this data to said input/output port; and displaying information, which relates to the fact that transmission of image data between said input/output port and said image-data storage device has been selected, on a display device in dependence upon the selection made.

10. The method according to claim 7, further comprising the steps of:

sensing whether an image data processing device has been connected to said external output port; and displaying information, which relates to absence or presence of a connection to said image-data processing device, on a display device depending upon whether or not the connection has been sensed.

11. The method according to claim 7, wherein said image-data storage device is an image memory freely removable from the scanner, and said method further comprises the steps of:

sensing whether said image memory has been loaded in the scanner; and displaying information as to whether said image memory has been loaded or not to on a display device depending upon whether or not loading of said image memory has been sensed.

12. The method according to claim 7, further comprising the steps of:

when it has been selected to apply image data to said image-data storage device, compressing image data at a compression ratio higher than that which prevails when it is selected to apply image data to said external output port; and applying image data that has been compressed to said image-data storage device or to said external output port depending upon the selection made.

13. A scanner comprising:

an image sensing device for sensing the image of an original and outputting image data representing the image of the original;

an image-data storage device for storing image data applied thereto;

an external output port for outputting the applied image data externally of the scanner;

an output-destination selecting device for selecting whether image data that has been output from said image sensing device is to be applied to said image-data storage device or to said external output port;

a changeover switch for applying the image data, which has been output from said image sensing device, to said image-data storage device or to said external output port depending upon the selection made by said output-destination selecting device;

remaining-capacity sensing means for sensing remaining storage capacity of said image-data storage device; and imaged-original count calculating means for calculating, on the basis of the remaining storage capacity sensed by said remaining-capacity detecting means, the number of originals whose image data, which has been obtained by image sensing by said image sensing device, can be stored in said image-data storage device.

14. The scanner according to claim 13, further comprising size setting device for setting the size of an original whose image is sensed by said image sensing device;

wherein said imaged-original count calculating means calculates, based upon the size of an original set by said size setting device and the remaining storage capacity sensed by said remaining-capacity sensing means, the number of originals whose image data, which has been obtained by image sensing by said image sensing device, can be stored in said image-data storage device.

15. The scanner according to claim 13, further comprising an original-information storage device for storing information relating to an original whose image has been sensed by said image sensing device;

wherein said imaged-original count calculating means calculates the number of originals whose image data, which has been obtained by image sensing by said image sensing device, can be stored in said image-data storage device on the basis of the information, which relates to an original, stored in said original-information storage device and the remaining storage capacity sensed by said remaining-capacity sensing means.

16. The scanner according to claim 15, wherein said imaged-original count calculating means calculates the count using information that relates to an original whose image was sensed last, this information being contained in the information, which relates to an original, stored in said original-information storage means.

17. The scanner according to claim 13, further comprising:

a prescan command device for providing a prescan command; and image-sensing control means, responsive to the prescan command provided by said prescan command device, for controlling said image sensing device so as to sense the image of an original;

wherein said imaged-original count calculating means calculates the number of originals whose image data, which has been obtained by image sensing by said image sensing device, can be stored in said image-data storage device based upon information relating to the original sensed by said image sensing device under the control of said image sensing control means and the remaining storage capacity sensed by said remaining-capacity sensing means.

18. The scanner according to claim 13, further comprising data compression device for compressing image data, which has been output by said image sensing device, at a set compression ratio;

wherein said changeover switch applies image data that has been compressed by said data compression device to said image-data storage device or to said external output port depending upon the selection made by said output-destination selecting device; and said imaged-original count calculating means calculates the number of originals whose image data, which has been obtained by image sensing by said image sensing device, can be stored in said image-data storage device based upon the compression ratio and the remaining storage capacity sensed by said remaining-capacity sensing means.

19. A method of controlling a scanner having an image sensing device for sensing the image of an original and outputting image data representing the image of the original, an image-data storage device for storing image data applied thereto, and an external output port for outputting the applied image data externally of the scanner, the method comprising the steps of:

selecting whether image data that has been output from said image sensing device is to be applied to said image-data storage device or to said external output port;

applying the image data, which has been output from said image sensing device, to said image-data storage device or to said external output port depending upon the selection made;

sensing remaining storage capacity of said image-data storage device; and calculating, on the basis of the remaining storage capacity sensed, the number of originals whose image data, which has been obtained by image sensing by said image sensing device, can be stored in said image-data storage device.

20. The method according to claim 19, further comprising the steps of:

setting the size of an original whose image is sensed by said image sensing device;

wherein imaged-original count calculating processing calculates the number of originals whose image data, which has been obtained by image sensing by said image sensing device, can be stored in said image-data storage device on the basis of the set size of the original and sensed remaining storage capacity.

21. The method according to claim 19, further comprising the step of storing information relating to an original whose image has been sensed by said image sensing device;

wherein imaged-original count calculating processing calculates the number of originals whose image data, which has been obtained by image sensing by said image sensing device, can be stored in said image-data storage device on the basis of stored information relating to an original and sensed remaining storage capacity.

22. The method according to claim 21, further comprising the step of calculating the count using information that relates to an original whose image was sensed last, this information being contained in the information, which relates to an original, stored in said original-information storage device.

23. The method according to claim 19, further comprising the step of sensing the image of an original in response to application to a prescan command;

wherein imaged-original count calculating processing calculates the number of originals whose image data, which has been obtained by image sensing by said image sensing device, can be stored in said image-data storage device on the basis of information relating to the original sensed by said image sensing device in response to the prescan command, and the sensed remaining storage capacity.

24. The method according to claim 19, further comprising the steps of:

compressing image data, which has been output by said image sensing device, at a set compression ratio; and applying image data that has been compressed by said data compression device to said image-data storage device or to said external output port depending upon the selection made by said output-destination selecting device;

wherein imaged-original count calculating processing calculates the number of originals whose image data, which has been obtained by image sensing by said image sensing device, can be stored in said image-data storage device on the basis of the compression ratio and sensed remaining storage capacity.

* * * * *